April 22, 1958 L. J. BATEMAN 2,832,070

BINARY DECODER

Filed Jan. 4, 1956 2 Sheets-Sheet 1

LEE J. BATEMAN,
INVENTOR

BY Henry Heyman
ATTORNEY

LEE J. BATEMAN,
INVENTOR

BY Henry Heyman
ATTORNEY

United States Patent Office 2,832,070

Patented Apr. 22, 1958

2,832,070

BINARY DECODER

Lee J. Bateman, Los Angeles, Calif., assignor to Hughes Aircraft Company, Culver City, Calif., a corporation of Delaware Application January 4, 1956, Serial No. 557,334

8 Claims. (Cl. 340—347)

This invention relates generally to signal converters and, more particularly, to circuits such as binary decoders for converting signals containing intelligence in the form of binary coded information to direct-current voltage levels proportional to the intelligence contained in the binary signal while maintaining place significance in the direct-current voltage level.

In the computing and automation fields it is often desirable to employ a digital computer, particularly where rapidity of operation, reliability, and accuracy are considerations. When information is to be used in a fully automatic system, binary representation is quite adequate. However, when the signals which are developed by the digital computer are in binary form and are to be interpreted by human beings or are to be utilized to control some device such as a servomotor, a pen recorder, or the dot on the face of an oscilloscope, a direct-current voltage level is needed to obtain proper operation. Therefore, an output system for converting the binary coded information to a direct-current voltage level must be employed.

In design of an output conversion system for digital computers, one of the main factors to be considered is the complexity of the system. In the past, such converters have comprised diodes in conjunction with relays and precision resistors. The pulsed or coded information from the digital computer was applied to diode converters which operated relays. The information was then held in storage by mechanical relays until such time as it was needed. Precision resistance elements were then introduced into one leg of a self balancing bridge by the relay storage devices and the output of the birdge was applied to the output reading device such as, for example, a servo system, for proper utilization. Thus, the mechanical analog of the binary coded signal was developed and utilized.

It is apparent that such a system has several inherent disadvantages. The use of precision resistance elements gives rise not only to high cost of production but also to acute maintenance problems since the resistors cannot be allowed to vary appreciably and still maintain adequate operation. Another disadvantage is in the use of relay storage devices. This causes relatively slow operation since opening and closing of relays take on the order of from milliseconds to tenths of seconds. It is also obvious that a large number of components is required in order to provide the desired storage necessary when using the digital computer.

Accordingly, it is an object of the present invention to provide new and novel means for binary decoding.

Another object of the present invention is to provide a purely electronic circuit for binary decoding which remains relatively simple in operation and which utilizes relatively few components.

A further object of the present invention is to provide a binary decoder for producing an output direct-current voltage level signal that retains place significance and which is indicative of the analog value of the binary coded input signal.

A binary decoder in accordance with the present invention includes means for converting a series of periodically recurring pulses into a stairstep voltage signal. Signal translating means is connected to the converting means, while means for inserting a binary intelligence signal into the stairstep signal is connected across the input to the signal translating means.

A series of recurring pulses, such as clock pulse signals, are applied to the converting means. The stairstep output signal which is developed by the converting means is then applied to the translating device. A signal containing the complement of the binary information developed by the digital computer is then applied to the means for inserting said information into the stairstep signal. The output signal from the signal translating device then comprises a direct-current voltage level which is indicative of the decimal value of the output signal from the digital computer.

The novel features of the present invention are set forth in particularity in the appended claims. Other and more specific objects will become apparent from a consideration of the following description taken in conjunction with the accompanying drawings in which:

Figure 1:
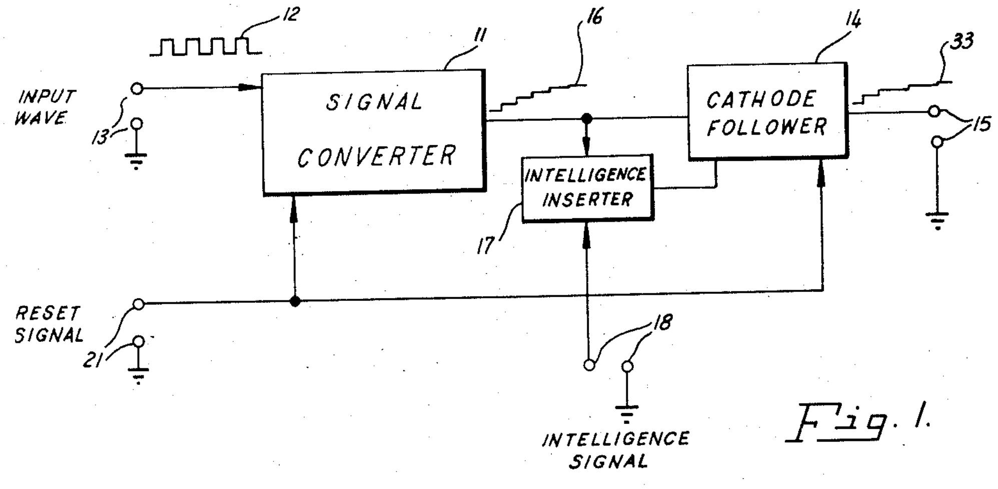
Fig. 1 is a schematic diagram in block form of the binary decoder of the present invention.

Referring now to the drawings and, more particularly, to Fig. 1, there is shown a signal converter represented by rectangle 11 for producing a stairstep output voltage from a series of periodically recurring input pulses which may be the clock pulses used in a digital computer. The series of input pulses 12 are applied to input terminals 13, one of which is grounded and the other of which is connected to signal converter 11. A signal translating device such as a cathode follower represented by rectangle 14 is connected to the output of signal converter 11 and has output terminals 15 one of which is grounded. Means for inserting intelligence signals into the stairstep output 16 derived from the signal converter such as intelligence inserter 17 is connected across the input of cathode follower 14. The intelligence signal is applied to input terminals 18, one of which is grounded and the other of which is connected to intelligence inserter 17. The intelligence signal may be developed by a digital computer, not shown, which may be connected to input terminals 18. A reset signal for returning both the signal converter and the cathode follower to their quiescent states may be applied to input terminals 21, one of which is grounded and the other of which is connected in parallel to signal converter 11 and cathode follower 14.

Figure 4:
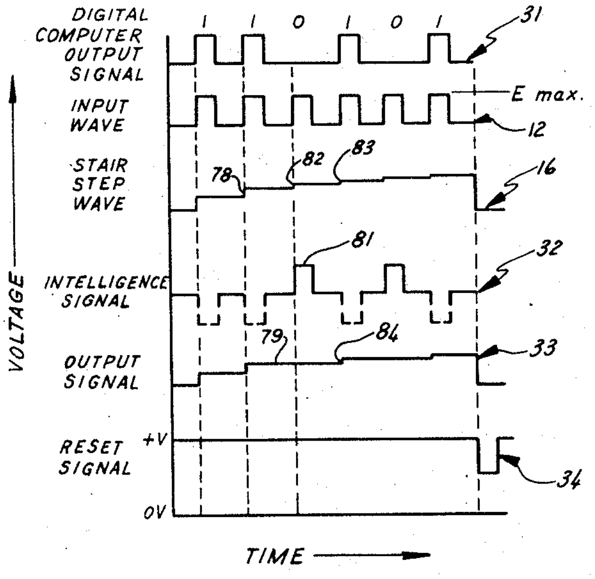
Fig. 4 is a graph illustrating voltage waveforms taken at various points throughout the circuits of Figs. 1 and 2.

In discussing the operation of the circuit of Fig. 1, reference is now made to Fig. 4 wherein the abscissa represents time and the ordinate voltage. The digital computer output signal 31 was taken by measuring across the output terminals of a digital computer, the input wave 12 was taken by measuring across input terminals 13, while the stairstep wave 16 was taken by measuring between the output of signal converter 11 and ground. The intelligence signal 32 which is applied to intelligence inserter 17 is taken by measuring across input terminals 18. It will be noted that the intelligence signal is the complement of the digital computer output signal above referred to. The output signal 33 was taken by measuring across output terminals 15 while the reset signal 34 was measured across terminals 21.

Assume that the signal to be converted or decoded is a binary coded signal such as that shown at 31 on Fig. 4 containing information represented by pulses or no pulses. If a pulse is present, a binary 1 is represented, and when no pulse is present, a binary zero is indicated as shown by the 1's and 0's above curve 31, Fig. 4. Further, assume that a reset signal 34 has just been applied to the circuit so that all the components therein are in their quiescent states and all voltages present are at their zero level.

Assume now that a series of pulses such as those shown by curve 12 of Fig. 4 are applied to input terminals 13 of signal converter 11. The pulses present in the input wave must occur concurrently with the binary coded signals from the digital computer. The pulses of the input wave must all have equal amplitude and duration. As shown by curve 12 of Fig. 4, pulses applied to signal converter 11 all have the value of binary 1. These pulses may be generated by any appropriate circuit but in a digital computer they may be readily obtained from a clock pulse generator.

Signal converter 11 changes the applied input waves from a series of pulses to a direct-current voltage having steps or changes in level which occur at the leading edge of each of the pulses of the applied input wave. As shown by curve 16 of Fig. 4 which is the output wave of signal converter 11, the stairsteps are not equal in value, each step becoming progressively smaller than the one immediately preceding it. If a curve were drawn through the average value of the stairstep wave, it would be seen to resemble somewhat the familiar voltage charge for a capacitor. Each of the steps within curve 16 represents $(E_{max})(2^{-i})$, where $i$ represents the number of binary 1's applied after the reset pulse and $E_{max}$ represents the potential level of the binary 1's.

Stairstep wave 16 is then applied to the input of cathode follower 14. If nothing further were added, the cathode follower would pass stairstep wave 16 to output terminals 15. However, an intelligence signal is applied to intelligence inserter 17 which operates in the following manner. As seen by curve 32, the intelligence signal is the exact complement of digital computer output signal 31. This is seen by comparing curve 31 with curve 32 and further by the dashed portions below the reference line of curve 32, each representing a binary 1 from the digital computer output signal. From curve 32 it may be seen that pulses represent binary 0's while no pulses or negative-going pulses are used to represent binary 1's.

During application of a binary 1 from the intelligence signal 32, that is, no pulse, stairstep wave 16 is allowed to pass by way of cathode follower 14 to output terminals 15. However, when a binary zero is applied to intelligence inserter 17, as represented by the presence of a positive-going pulse on curve 32, that step of curve 16 which is concurrent with the binary zero is suppressed or not allowed to pass to output terminals 15 as represented by curve 33 of Fig. 4.

By comparing curve 33 with curve 16, it is readily seen that not only is that step which is concurrent with the binary zero suppressed, but that only the value represented by the next succeeding step is allowed to pass in the absence of a binary zero. Therefore, output signal 33 represents the analog equivalent of the binary output signal from the digital computer as seen at curve 31 on Fig. 4.

Prior to application of another digital computer output signal which is to be converted, a reset signal 34 is applied to input terminals 21. Reset signal 34 causes the voltage levels appearing throughout the circuit of Fig. 1 to return to their zero or reference levels and the various components therein to return to their quiescent states.

Figure 2:
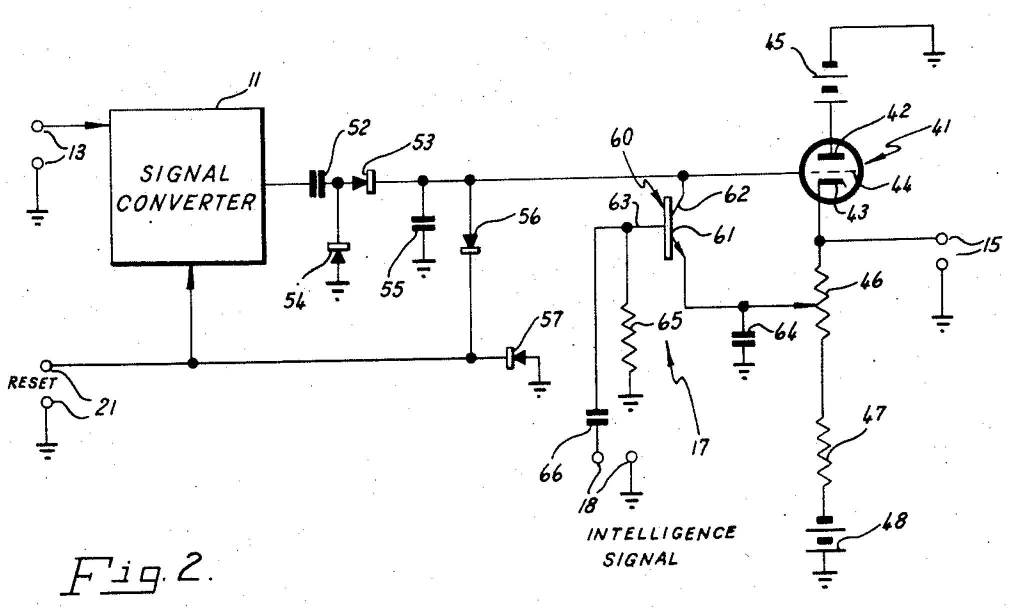
Fig. 2 is a schematic circuit diagram, partly in block form, of a preferred embodiment of the binary decoder of the present invention.

Referring now more particularly to Fig. 2, there is shown a cathode follower such as vacuum tube triode 41 having an anode 42, a cathode 43, and at least one grid 44. A source of potential 45 has its positive terminal connected to anode 42 and its negative terminal connected to ground. Resistors 46, 47 are connected in series between cathode 43 and the negative terminal of another source of potential 48, the positive terminal of which is connected to ground. Batteries 45 and 48 supply operating potential for vacuum tube 41. A capacitor 52 is connected between signal converter 11 and the anode of a diode 53, the cathode of diode 53 being connected to grid 41. Another diode 54 has its cathode connected to the junction between capacitor 52 and diode 53, its anode being connected to ground. Another capacitor 55 is connected between grid 44 and ground. Capacitors 52 and 55 in conjunction with diode 53 are used to apply the output signal from signal converter 11 to grid 44 of vacuum tube 41 while diode 54 is a clamping diode. Diode 56 has its anode connected to grid 44 and its cathode connected to one of the input terminals 21 and is utilized to apply a reset signal to the circuit of Fig. 2. Diode 57 has its cathode connected to one of terminals 21 and its anode connected to ground and is utilized as a clamping diode to keep the components within the circuit of Fig. 2 from falling below the zero potential reference level upon application of a reset signal. Intelligence inserter 17 is represented as a transistor 60 having an emitter 61, a collector 62, and a base 63. Transistor 60 is shown as an N–P–N transistor by its accepted schematic symbol and in the presently preferred embodiment is a junction transistor. Collector 62 is connected to grid 44 while emitter 61 is connected to a movable tap of resistor 46. A capacitor 64 is connected between emitter 61 and ground. A resistor 65 is connected between base 63 and ground while a coupling capacitor 66 is connected between base 63 and one of the terminals 18 and is used to impress the intelligence signal upon transistor 60.

In discussing the operation of the circuit of Fig. 2, reference is now made to Fig. 4. Input wave 12 is applied to terminals 13 of signal converter 11 and is converted again to a stairstep wave as shown at 16 and 33, as hereinabove described. Each rise in potential of stairstep wave 16 is coupled by capacitor 52 to the anode of diode 53. This causes diode 53 to conduct, applying this rise in potential to grid 44 of vacuum tube 41 and at the same time charges capacitor 55 to this potential level. Due to the rise of potential on its grid, vacuum tube 41 is caused to conduct more heavily than it previously was. This potential level is stored by capacitor 55 since it causes diode 53 to become slightly back biased and therefore vacuum tube 41 remains at this level of conduction. The increased conduction through vacuum tube 41 causes a rise in the potential level present at cathode 43 which is seen at output terminals 15 and which causes capacitor 64 to assume an equivalent charge.

Each rise in potential of curve 16 will be passed in this manner in the absence of any intelligence signal being applied to transistor 60. However, assume now that a positive-going pulse 81 is applied to terminals 18 which represents a binary zero as hereinabove described. This positive pulse will be applied by capacitor 66 to base 63, thus causing base 63 to become more positive than emitter 61. This causes transistor 60 to become conducting and the current conduction is large enough to immediately saturate the transistor. As is well known in the art, upon saturation of a junction transistor the impedance which it represents between its collector and emitter is extremely small. For all practical purposes, therefore, the rise in potential level 82 of curve 16 which is present concurrently with pulse 81 and which is passed by diode 53 sees a short circuit to ground as compared to the impedance of capacitor 55. This results because capacitor 52 has less capacitance than capacitor 64 and will pass the output pulse to ground through capacitor 64 without appreciably changing the voltage level present on capacitor 64 when transistor 60 conducts. Furthermore, since the voltage level present on capacitor 64 which was developed by the change in potential present on cathode 43 of vacuum tube 41 is the same as the voltage level present on capacitor 55, capacitor 55 will not discharge when transistor 60 conducts. Resistor 46 is provided with an adjustable tap to insure equality of potential between capacitors 64 and 55. Therefore, output signal 33 will retain the level which it acquired upon application of the previous rise 78 of curve 16 as shown at 79 on curve 33.

Upon application of the next succeeding pulse 83 on curve 16, output signal 33 will also rise as shown at 84 due to the increase in conduction of vacuum tube 44 and the rise in potential on capacitor 64 since there is an absence of a binary zero on curve 32. This results because transistor 60 remains non-conducting during this period due to base 63 being maintained negative with respect to emitter 61 by the applied intelligence signal. A non-conducting junction transistor represents an exceedingly high impedance between its collector and emitter, on the order of several megohms, thus appearing as an open circuit to the applied potential.

Therefore, it is seen that each rise in potential of the stairstep wave from signal converter 11 is passed by cathode follower 41 and appears at output terminals 15 when a binary one is present in the digital computer output signal and that the potential level present at output terminals 15 remains constant when a binary zero is present in the digital computer output signal. This results in an output signal at terminals 15 which is representative of the decimal value of the binary coded output signal from the digital computer.

Figure 3:
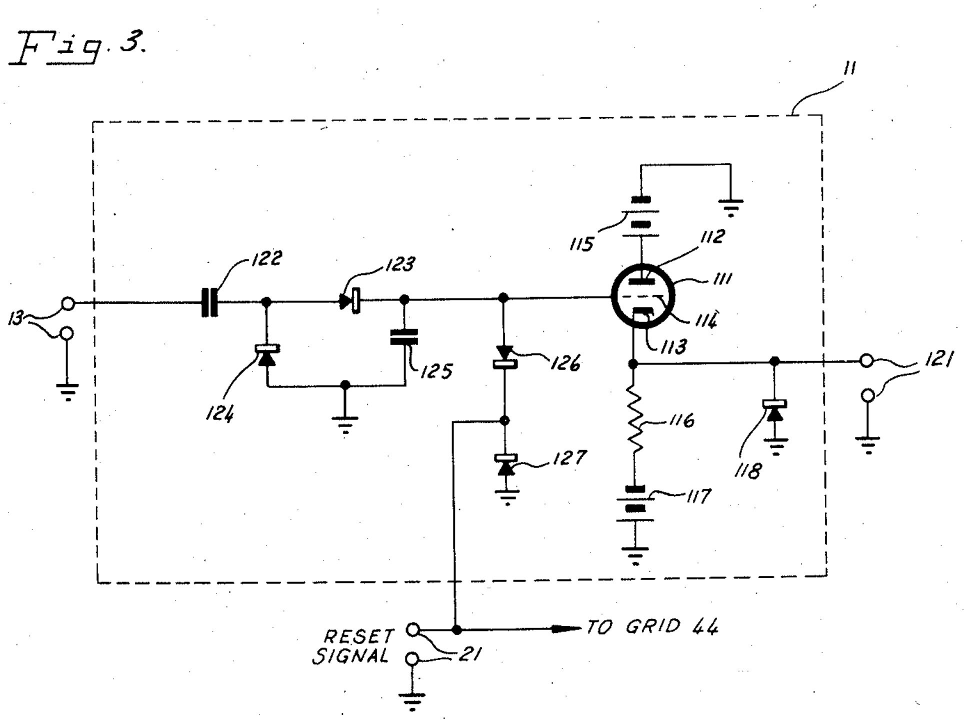
Fig. 3 is a schematic circuit diagram of the signal converter for producing a stairstep output voltage.

Reference is now made more particularly to Fig. 3. Signal converter 11 which is represented by dashed rectangle 11 is seen to include a vacuum tube 111 which has a cathode 113, an anode 112, and at least one grid 114. A source of operating potential such as battery 115 has its positive terminal connected to anode 112 and its negative terminal connected to ground. A resistor 116 is connected between cathode 113 and the negative terminal of a source of potential such as battery 117, the positive terminal of which is connected to ground. A clamping diode 118 is connected between cathode 113 and ground. One of output terminals 121 is connected to cathode 113 while the other is connected to ground. A capacitor 122 and a diode 123 are connected in series between input terminals 13 and grid 114, diode 123 being poled to pass positive-going signals. Another clamping diode 124 is connected between the junction between capacitor 122 and diode 123 and ground, while capacitor 125 is connected between grid 114 and ground. Diode 126 has its anode connected to grid 114 and its cathode to reset signal terminal 21 and is utilized to apply a reset signal to the circuit of Fig. 3. Clamping diode 127 has its cathode connected to terminal 21 and its anode connected to ground and is utilized to keep grid 114 from falling below ground potential.

In discussing the operation of the circuit of Fig. 3, reference will now be made to Fig. 4. Input pulses 12 are applied to terminals 13 and are coupled by capacitor 122 to the anode of diode 123. Diode 123 is caused to conduct thereby and apply the positive-going pulses to grid 114, at the same time causing the charge to be stored by capacitor 125. However, the charge which capacitor 125 assumes will be roughly equivalent to one-half the difference between its present charge and the amplitude of the applied input signal because capacitors 122 125 are chosen to have equal capacitance. It is therefore seen that as a series of constant amplitude pulses such as input wave 12 are applied to capacitor 125, the increase in charge becomes decreasingly less with each successive pulse. This wave developed across capacitor 125 being applied to grid 114 causes conduction through tube 111 to vary accordingly. As the conduction varies, the output wave which is present at cathode 113 and seen at terminals 121 also varies, reproducing the wave across capacitor 125. The wave present at terminals 121 is as shown at 16 on Fig. 4. The voltage at any step ($e_n$) is described by $e_n=(E_{max})(2^{-i})$, where $i$ is the number of steps after reset.

If a reset signal such as 34 is now applied to terminals 21, diode 126 is caused to conduct since its cathode is made more negative than its anode. Conduction of diode 126 completes a discharge path for capacitor 125, thus allowing it to completely discharge. However, if capacitor 125 tends to go below ground potential, diode 127 will conduct, clamping grid 114 to ground, thus causing capacitor 125 to stabilize at this point. As is indicated by the arrow, reset signal 34 is simultaneously applied to the remainder of the decoder circuit as shown on Fig. 2. Application of the reset signal to the circuit of Fig. 2 causes diodes 56 and 57 to operate in the manner above described for diodes 126 and 127, respectively, to return the associated circuit to its quiescent level.

It is to be understood that the decoder of the present invention may change according to any particular design considerations. The following list of components and their values is given by way of example only for a binary signal decoder circuit having an input signal of ten kilocycles per second:

| | |
|---|---|
| Tubes 41 and 111 | ½–5687. |
| Transistor 60 | TI 904–A Texas Instruments N–P–N junction transistor type 904–A. |
| Resistor 46 | 0–100 ohms. |
| Resistor 47 | 1,000 ohms. |
| Resistor 65 | 100,000 ohms. |
| Resistor 116 | 2,200 ohms. |
| Capacitors 52, 55, 122, 125 | 1,000 micro-microfarads. |
| Capacitor 64 | .05 microfarad. |
| Capacitor 66 | 100 micro-microfarads. |
| Batteries 45—115 | 200 volts. |
| Batteries 48—117 | 30 volts. |
| Diodes 53, 54, 56, 123, 124, 126 | Hughes Aircraft Company silicon junction diode type HD6008. |
| Diodes 57, 118, 127 | Hughes Aircraft Company germanium point contact diode type 1N100. |

There has been thus disclosed a binary signal decoder which converts intelligence in the form of binary representation from a digital computer into a direct-current voltage level which may be used to control any desired device.

What is claimed is:

1. A binary decoder comprising: a signal converter for producing a stairstep voltage wave from a series of periodically recurring pulses; a signal translating device having at least input and output terminals for passing said stairstep wave, said input terminals being connected to said signal converter; and control means responsive to the application of an intelligence signal to said control means connected across said input terminals for maintaining the voltage level across said input terminals substantially constant during the periods of time that said intelligence signal is present, whereby the signal appearing at said output terminals is a composite of the stairstep wave and the intelligence.

2. A binary decoder for converting an output signal developed by a digital computer and having two states into a direct-current voltage comprising: a signal converter for producing a stairstep voltage from a series of periodically recurring pulses, each step of said stairstep voltage being equal in amplitude to the maximum voltage level of the applied pulses times two raised to the minus power of the number of pulses applied; a first signal path connected to said converter and adapted to allow the stairstep voltage to pass therethrough during the time the computer signal is in one of its states; and a second signal path connected to said converter and adapted to allow the stairstep voltage to pass therethrough during the time the computer signal is in the other of its states, whereby an output signal is produced which is a composite of the stairstep voltage and the computer signal and represents the analog equivalent of the computer output signal.

3. A binary decoder for converting an output signal developed by a digital computer and having two states into a direct-current voltage comprising: a signal converter for producing a stairstep voltage from a series of periodically recurring pulses; a vacuum tube having a cathode, an anode, and at least one grid; an output signal circuit connected to said cathode; a source of operating potential connected between said anode and said output signal circuit; coupling means for applying the stairstep voltage to said tube connected between said grid and said converter; and means connected between said grid and cathode for bypassing the stairstep voltage when the computer signal is in one of its states and for allowing the stairstep voltage to be applied to said grid when said computer signal is in the other of its states, whereby an output signal is produced across said output signal circuit which is a composite of the stairstep voltage and the computer signal and represents the analog equivalent of the computer output signal.

4. A binary decoder for converting an output signal developed by a digital computer and having two states into a direct current voltage comprising: a signal converter for producing a stairstep voltage from a series of periodically recurring pulses; a vacuum tube having a cathode, an anode, and at least one grid; an output signal circuit connected to said cathode; a source of operating potential connected between said anode and said output signal circuit; coupling means for applying the stairstep voltage to said tube connected between said grid and said converter; a transistor having an emitter, a collector, and a base, said collector being connected to said grid, said emitter being connected to said cathode; a coupling network connected to said base for applying the computer output signal to said transistor, whereby said transistor is caused to conduct when said computer output signal is in one of its states and is non-conducting when said computer output signal is in the other of its states; first charge storage means connected between said grid and a point of fixed potential for maintaining said grid at substantially a constant potential level during the intervals when there is no change in the stairstep voltage; and second charge storage means connected between said emitter and said point of fixed potential for bypassing the stairstep voltage when said transistor is conducting, whereby an output signal is produced across said output signal circuit which is a composite of the stairstep voltage and the computer output signal and represents the analog equivalent of the computer output signal.

5. The binary decoder defined in claim 4 wherein said transistor is an N-P-N junction transistor.

6. A binary decoder for converting an output signal developed by a digital computer and having two states into a direct-current voltage comprising: a signal converter for producing a stairstep voltage from a series of periodically recurring pulses; a vacuum tube having a cathode, an anode, and at least one grid; an output signal circuit connected to said cathode; a source of operating potential connected between said anode and said output signal circuit; a first capacitor and a first diode connected in series between said grid and said signal converter for applying said recurring pulses to said grid; a second capacitor connected between said grid and a point of fixed potential for maintaining the potential on said grid substantially constant during the intervals between changes in the stairstep voltage and during a time stairstep voltage changes are bypassed; a second diode connected to said grid for applying a reset signal to said vacuum tube to cause said tube and its associated components to return to their quiescent or zero states; a transistor having a collector, an emitter, and a base, said collector being connected to said grid, said emitter being connected to said cathode; a coupling network connected to said base for applying the computer output signal to said transistor, whereby said transistor becomes conducting when the computer output signal is in one state and is non-conducting when the computer output signal is in the other state; and a third capacitor connected between said emitter and said point of fixed potential for bypassing any change in the stairstep voltage during the time said transistor is conducting, whereby an output signal is developed across said output signal circuit which is a composite of the stairstep voltage and computer output signal and which represents the analog value of the computer output signal.

7. The binary decoder as defined in claim 6 wherein the impedance of said first capacitor is greater than the impedance of said third capacitor, while the impedance of said first capacitor is much less than the impedance of said second capacitor at the repetition frequency of said pulses, whereby the rise in voltage of the stairstep voltage is bypassed to said point of fixed potential by said third capacitor when said transistor is conducting without substantially varying the potential which may be present on said second and third capacitors.

8. A binary decoder for converting a binary signal developed by a digital computer and having two states into a direct-current voltage comprising: a signal converter for producing a stairstep voltage from a series of periodically recurring pulses; a first signal path responsive to the binary signal connected to said converter and adapted to allow the stairstep voltage to pass therethrough during the time the binary signal is in one of its states; and a second signal path connected to said converter and adapted to allow the stairstep voltage to pass therethrough during the time the binary signal is in the other of its states, whereby an output signal is produced which is a composite of the stairstep voltage and a computer signal and represents the analog equivalent of the computer output signal.

References Cited in the file of this patent

UNITED STATES PATENTS 2,529,547 Fisher ---------------- Nov. 14, 1950